United States Patent
Lim et al.

(10) Patent No.: US 11,830,971 B2
(45) Date of Patent: Nov. 28, 2023

(54) BATTERY CELL, AND BATTERY MODULE AND BATTERY PACK INCLUDING SAME

(71) Applicant: LG CHEM, LTD., Seoul (KR)

(72) Inventors: Seong-Yoon Lim, Daejeon (KR); Ji-Hyun Kim, Daejeon (KR); Sun-Mo An, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 564 days.

(21) Appl. No.: 15/578,828

(22) PCT Filed: Jun. 3, 2016

(86) PCT No.: PCT/KR2016/005948
§ 371 (c)(1),
(2) Date: Dec. 1, 2017

(87) PCT Pub. No.: WO2016/195438
PCT Pub. Date: Dec. 8, 2016

(65) Prior Publication Data
US 2018/0166667 A1    Jun. 14, 2018

(30) Foreign Application Priority Data

Jun. 4, 2015 (KR) .......................... 10-2015-0079342

(51) Int. Cl.
*H01M 10/052*    (2010.01)
*H01M 50/105*    (2021.01)
(Continued)

(52) U.S. Cl.
CPC ....... *H01M 10/052* (2013.01); *H01M 50/105* (2021.01); *H01M 50/136* (2021.01);
(Continued)

(58) Field of Classification Search
CPC ............. H01M 2/1016; H01M 2/0207; H01M 2/0267; H01M 2/1072; H01M 2/1077; H01M 50/105; H01M 10/052
See application file for complete search history.

(56) References Cited

U.S. PATENT DOCUMENTS 8,790,817 B2    7/2014    Hong et al.
8,993,144 B2    3/2015    Kwon et al.
(Continued)

FOREIGN PATENT DOCUMENTS

KR    10-2009-0010410 A    1/2009
KR    10-2010-0003557 A    1/2010
(Continued)

OTHER PUBLICATIONS

International Search Report (PCT/ISA/210) issued in PCT/KR2016/005948, dated Sep. 27, 2016.

*Primary Examiner* — Uyen M Tran
(74) *Attorney, Agent, or Firm* — Birch, Stewart, Kolasch & Birch, LLP

(57) ABSTRACT

A battery cell accommodated in a module case of a battery module according to an embodiment of the present disclosure, is characterized in that at least one of the battery cell is included and accommodated in the module case, and has a shape corresponding to internal space of the module case so as to prevent formation of dead space in the module case.

16 Claims, 5 Drawing Sheets

(51) Int. Cl.
*H01M 50/211* (2021.01)
*H01M 50/136* (2021.01)

(52) U.S. Cl.
CPC ...... *H01M 50/211* (2021.01); *H01M 2250/20* (2013.01); *Y02T 90/40* (2013.01)

(56) References Cited

U.S. PATENT DOCUMENTS

| | | | |
|---|---|---|---|
| 9,548,475 B2 | 1/2017 | Kang et al. | |
| 2005/0142439 A1* | 6/2005 | Lee | H01M 2/021 |
| | | | 429/163 |
| 2007/0264535 A1* | 11/2007 | Lee | H01M 2/0207 |
| | | | 429/7 |
| 2010/0188800 A1* | 7/2010 | Ashizaki | H01G 11/12 |
| | | | 361/502 |
| 2011/0064991 A1* | 3/2011 | Ahn | H01M 2/021 |
| | | | 429/153 |
| 2011/0076551 A1* | 3/2011 | Nagaoka | H01M 2/1022 |
| | | | 429/179 |
| 2011/0151298 A1* | 6/2011 | Kim | H01M 10/647 |
| | | | 429/99 |
| 2012/0115020 A1* | 5/2012 | Hwang | H01M 10/049 |
| | | | 429/163 |
| 2012/0156550 A1* | 6/2012 | Guen | H01M 2/206 |
| | | | 429/163 |
| 2013/0216880 A1 | 8/2013 | Park et al. | |
| 2016/0036017 A1* | 2/2016 | Seong | H01M 2/021 |
| | | | 429/100 |

FOREIGN PATENT DOCUMENTS

| | | |
|---|---|---|
| KR | 10-2011-0105737 A | 9/2011 |
| KR | 10-2012-0066877 A | 6/2012 |
| KR | 10-2013-0119207 A | 10/2013 |
| KR | 10-2013-0124622 A | 11/2013 |
| KR | 10-2014-0086067 A | 7/2014 |
| KR | 10-2015-0032971 A | 4/2015 |
| KR | 10-2015-0047030 A | 5/2015 |

* cited by examiner

BATTERY CELL, AND BATTERY MODULE AND BATTERY PACK INCLUDING SAME

TECHNICAL FIELD

The present disclosure relates to a battery cell, and a battery module and a battery pack including the battery cell.

The present application claims priority to Korean Patent Application No. 10-2015-0079342 filed on Jun. 4, 2015 in the Republic of Korea, the disclosure of which is incorporated herein by reference.

BACKGROUND ART

Recently, electric vehicles or hybrid vehicles, in which a rechargeable secondary battery may be used as a power supply, instead of fossil fuels, are gaining attention.

In such electric vehicles or hybrid vehicles, in general, in order to ensure a sufficient battery capacity that allows a greater distance per charge, a battery pack including at least one assembly of a battery module including at least one battery cell which is a secondary battery is mounted.

However, since the battery pack mounted in a vehicle is mounted as a component of the vehicle, the size or number of module cases of the battery module may be restricted according to the design of the vehicle or requirements by vehicle manufacturer. Accordingly, in order to provide a sufficient battery capacity, a maximum capacity of a secondary battery needs to be secured in a module case of a limited size.

According to the conventional battery module, a module case of a battery module has an internal accommodation space having a shape corresponding to a secondary battery having an approximately rectangular parallelepiped shape to accommodate the secondary battery. In addition, in order to be coupled to a pack case of the battery pack, the module case includes a plurality of mounting parts that protrude out of the module case and are spaced apart from one another. Accordingly, empty space is inevitably formed between the plurality of mounting parts of the module case.

However, in the battery module according to the related art, the empty space still remains even after the module case is mounted in the pack case of the battery pack, and acts as a factor that unnecessarily increases the size and is irrelevant to providing battery capacity.

Accordingly, a method of maximizing a capacity of a battery cell within a limited module case size should be found.

DISCLOSURE

Technical Problem

Accordingly, the objective of the present disclosure is to provide a battery cell, a capacity of which may be maximized within a limited module case size, and a battery module and a battery pack including the battery cell.

Technical Solution

In order to achieve the objective, according to the present disclosure, a battery cell accommodated in a module case of a battery module is provided, wherein at least one battery cell is provided as the battery cell and accommodated in the module case, the battery cell having a shape corresponding to an internal space of the module case so as to prevent formation of a dead space in the module case.

The battery cell may have a volume corresponding to an internal space capacity of the module case.

The battery cell may include: a main cell part accommodated in the internal space of the module case; and an auxiliary cell part extending and protruding from the main cell part and disposed to fill the internal space of the module case and an empty space between the main cell part.

The auxiliary cell part may have a cross-section of at least one of a rectangular shape, a trapezoid shape, a semicircle shape, and a semi-elliptic shape.

The battery cell may have a concave-convex cross-section.

The battery cell may include at least one of a pouch-type secondary battery and a can-type secondary battery.

The module case may include at least one mounting part that is disposed to face the battery cell on at least two or more internal walls and that is coupled to a pack case of a battery pack.

A lead mounting portion, on which electrode leads of the battery cell are mounted, may be formed on one side of the module case, and the at least one mounting part may be formed on the other side of the module case.

The mounting parts may be provided in a pair, wherein the pair of mounting parts may be formed each at both end portions on the other side of the module case and spaced apart from each other by a predetermined distance.

The battery cell may include: a main cell part accommodated in the internal space of the module case, wherein the electrode leads are included on one side of the main cell part; and an auxiliary cell part extending and protruding from the other side of the main cell part, wherein the auxiliary cell part is disposed between the pair of mounting parts in the internal space of the module case.

The main cell part may include a rectangular section, and the auxiliary cell part may have a smaller rectangular section than the main cell part.

Both end portions of the main cell part connecting the one side and the other side of the main cell part may be folded at least once.

Both end portions of the main cell part may be folded twice.

In addition, according to the present disclosure, there is provided a battery module including: at least one battery cell according to the above-described embodiments; and a module case configured to accommodate the at least one battery cell.

In addition, according to the present disclosure, there is provided a battery pack including: at least one battery module according to the above-described embodiments; and a pack case configured to accommodate the at least one battery module.

Advantageous Effects

According to the above-described various embodiments, a battery cell, a capacity of which may be maximized within a limited module case size, and a battery module and a battery pack including the battery cell may be provided.

In detail, according to the present embodiments, space between mounting parts of a module case may be used as accommodation space for accommodating a cell unit, and by using a structure of a battery cell having a shape corresponding to the accommodation space, a capacity of the battery cell may be maximized within a limited module case size.

In addition, according to the present embodiments, by using a battery cell having sealing portions of at least three corners, which may be folded at least once, a battery cell having a great capacity may be accommodated in a module case.

BEST MODE

The present disclosure will be more apparent from description of preferred embodiments of the present disclosure with reference to the accompanying drawings. The embodiments described herein are exemplary only for better understanding of the present disclosure, and it should be understood that the present disclosure may be implemented by making various modifications to the embodiments described herein. In addition, for better understanding of the present disclosure, in the attached drawings, instead of real scale, dimensions of some components may be exaggerated.

Figure 1:
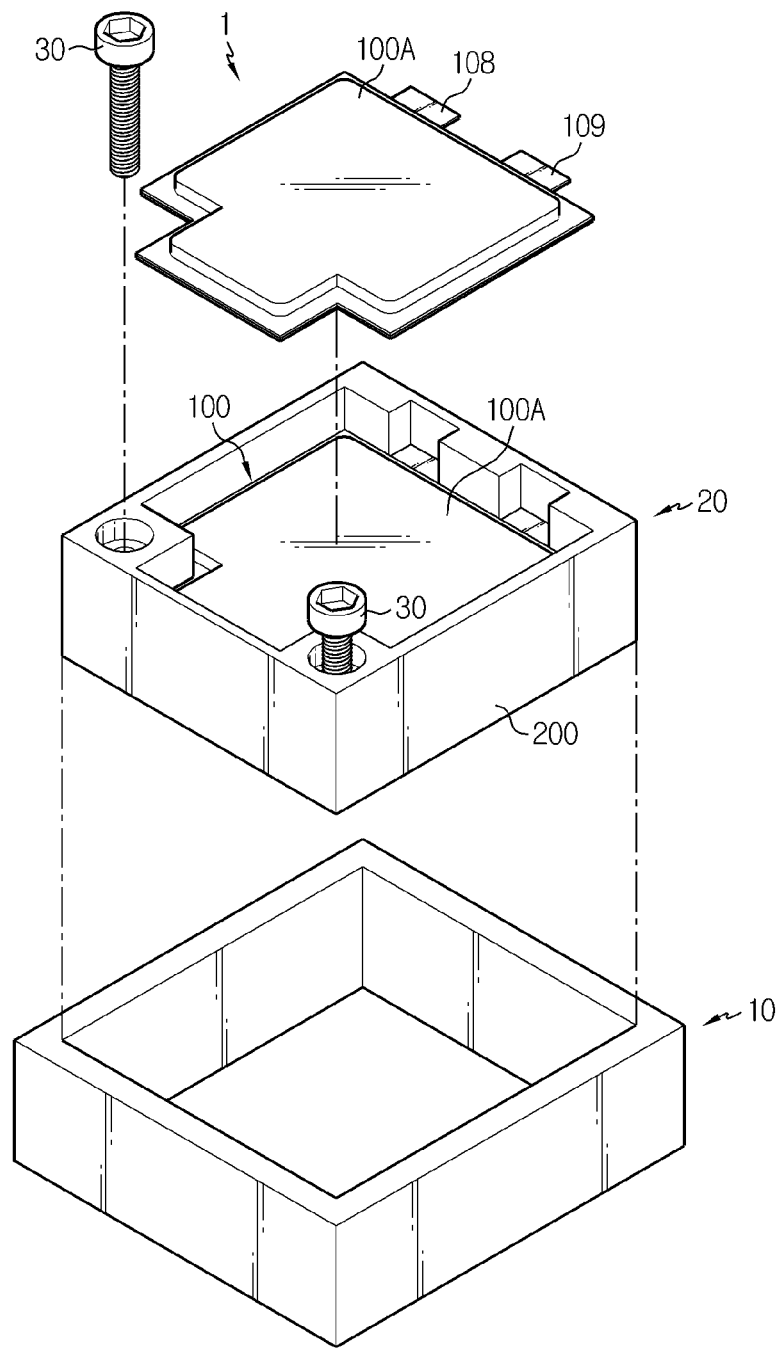
FIG. 1 is a disassembled perspective view of a battery pack according to an embodiment of the present disclosure.

FIG. 1 is a disassembled perspective view of a battery pack according to an embodiment of the present disclosure.

Referring to FIG. 1, a battery pack 1 includes a pack case 10 and a battery module 20. The battery pack 1 may be mounted in a vehicle such as an automobile, and particularly, recently, may be mounted mainly in electric vehicles or hybrid vehicles in which the battery pack is used as a battery of the vehicle.

The pack case 10 forms an external appearance of the battery pack 1, and accommodates one or more battery modules 20 which will be described later. The pack case 10 accommodating the battery module 20 may be coupled to a pack cover (not shown) covering the battery module 20 so as to package to the battery module 20 thereinside.

The battery module 20 may be accommodated in the pack case 10, and may be coupled to the pack case 10 and fixed in the pack case 10. For example, the battery module 20 may be coupled to the pack case 10 via a screw member 30 so as to be fixed inside the pack case 10.

Hereinafter, the battery module 20 according to the present embodiment will be described in further detail.

Figure 2:
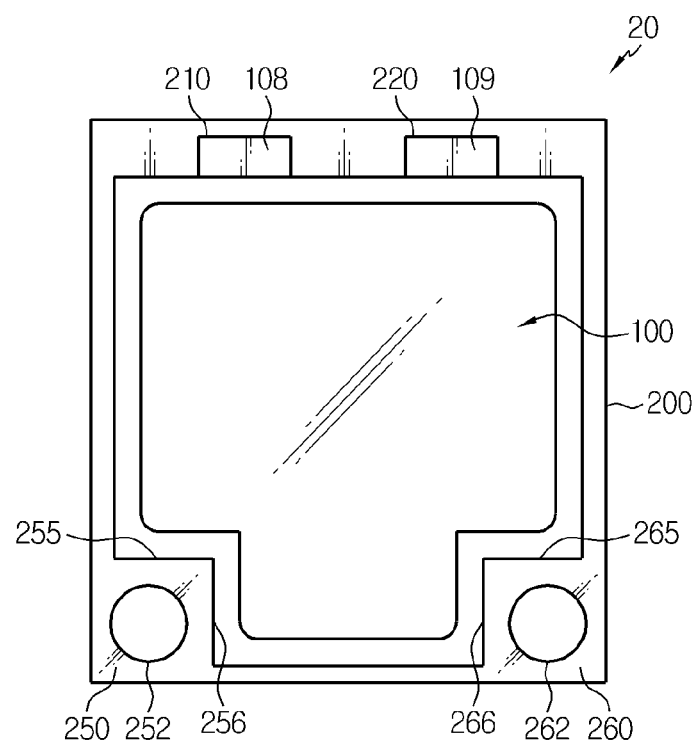
FIG. 2 is a view for explaining a battery module of the battery pack of FIG. 1.
Figure 3:
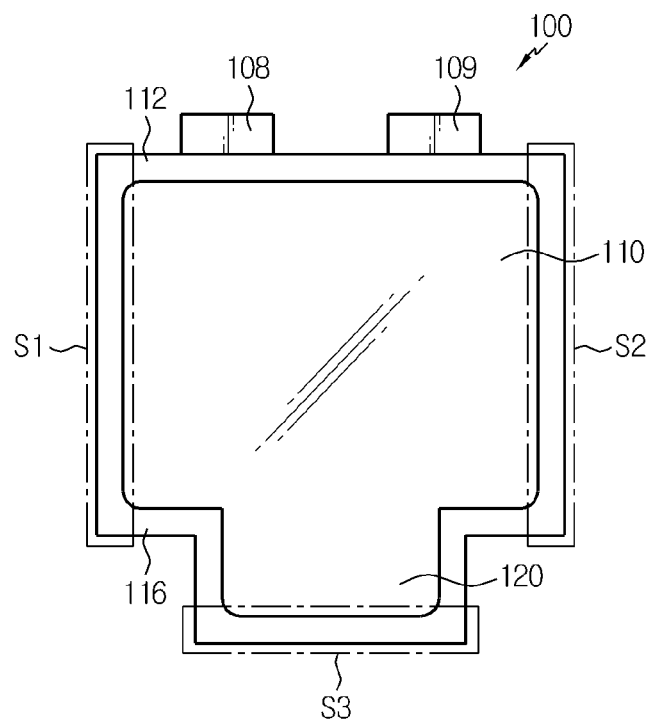
FIGS. 3 and 4 are views for explaining a battery cell of the battery module of FIG. 2.
Figure 4:
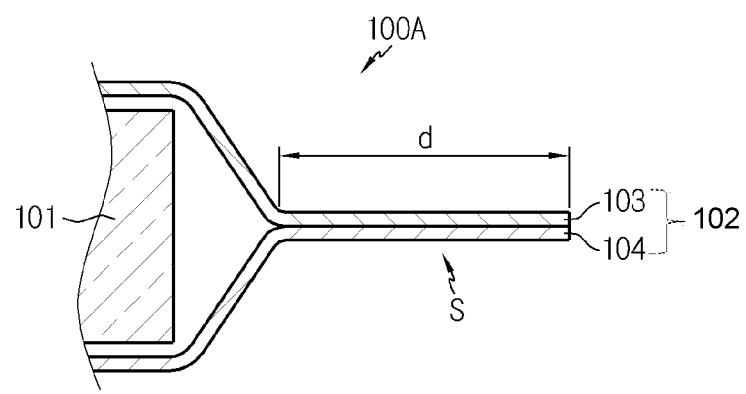
Figure 5:
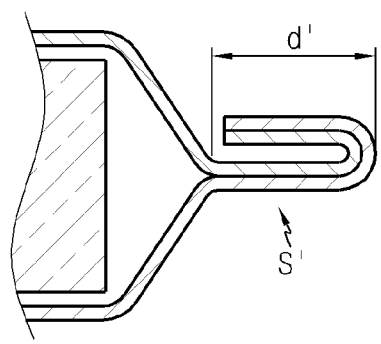
FIGS. 5 and 6 are views for explaining various folding structures of the battery cell of FIG. 3.
Figure 6:
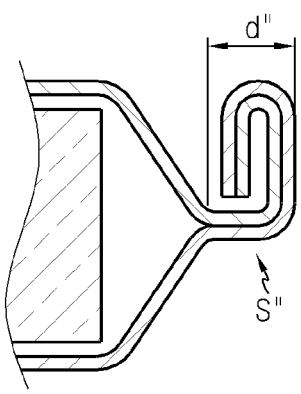
Figure 7:
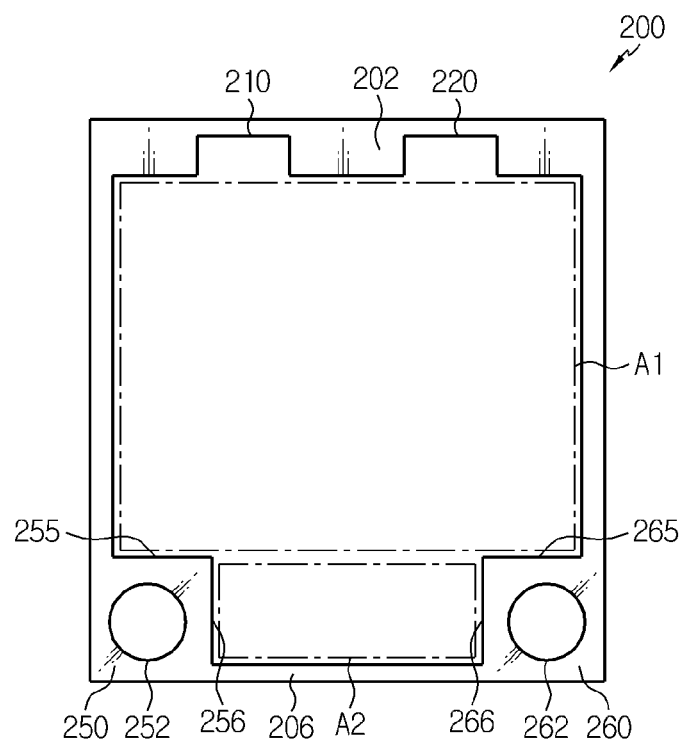
FIG. 7 is a view for explaining a module case of the battery module of FIG. 2.

FIG. 2 is a view for explaining a battery module of the battery pack of FIG. 1. FIGS. 3 and 4 are views for explaining a battery cell of the battery module of FIG. 2. FIGS. 5 and 6 are views for explaining various folding structures of the battery cell of FIG. 3. FIG. 7 is a view for explaining a module case of the battery module of FIG. 2.

Referring to FIGS. 2 through 7, the battery module 20 includes a cell unit 100 and a module case 200.

The cell unit 100 may include at least one battery cell 100 or more than one, that is, a plurality of battery cells 100. In detail, the cell unit 100 may be one battery cell or an assembly of battery cells, in which a plurality of battery cells that are stacked. Here, the plurality of battery cells 100A may be respectively mounted in individual cartridges, and then the individual cartridges may be stacked to form the cell unit 100.

In addition, instead of an assembly of a plurality of battery cells, the cell unit 100 may also be formed of a single battery cell. Meanwhile, the cell unit 100, which may include a plurality of battery cells or a single battery cell in the present embodiment, may also be referred to as "secondary battery" or "battery cell." That is, in the present embodiment, the "cell unit", "secondary battery" and "battery cell" may be understood as a term indicating substantially the same or similar meaning.

The battery cell 100 is accommodated in the module case 200 which will be described later, and may be formed to have a shape corresponding to an inner space of the module case 200 in order to prevent formation of dead space in the module case 200. In addition, the battery cell 100 may have a volume corresponding to internal space capacity in the module case 200. Having the shape and volume as described above, when the battery cell 100 is accommodated in the module case 200, it may be mounted in the module case 200 without creating empty space in the internal space of the module case 200.

Accordingly, according to the present embodiment, when the battery cell 100 is mounted inside the module case 200, an area and a volume of the battery cell 100 may be maximized inside the module case 200 of the battery module 20, and thus, a maximum battery cell capacity may be secured in a battery module of a same size.

The above-described battery cell 100 may be included as at least one of a pouch type secondary battery and a can-type secondary battery. Hereinafter, in the present embodiment, description will be focused on the battery 100 included as a pouch-type secondary battery.

The battery cell 100 may include an electrode assembly 101, a battery case 102, and electrode leads 108 and 109.

The electrode assembly 101 may include an positive electrode plate, a negative electrode plate and a separator. The electrode assembly 101 may have a shape corresponding to the external appearance of the battery cell 100 in the battery case 102. That is, in the present embodiment, the electrode assembly 101 may be formed to have an approximately concave-convex (⊓) shape corresponding to the external appearance of the battery cell 100.

Accordingly, as a result, a portion of the electrode assembly 101 according to the present embodiment may be disposed between a pair of mounting parts 250 and 260 in the module case 200, which will be described later, and thus, a maximum capacity of the electrode assembly 101 may be ensured within a limited size of the module case 200.

The electrode assembly 101 may be a stack type or a combination type of a stack type and a folding type. Considering easy manufacturing, a stack type formed by stacking may be more preferable. As the electrode assembly 101 is well-known, detailed description thereof will be omitted below.

The battery cases 103 and 104 are used to package the electrode assembly 101, and may form the external appearances of the main cell part 110 and the auxiliary cell part 150 of the battery cell 100 which will be described later.

The battery cases 103 and 104 may include an upper case 103 and a lower case 104. The upper case 103 and the lower case 104 may be coupled to each other to package the electrode assembly 101 thereinside. In addition, end portions of the upper case 103 and the lower case 104 coupled to each other protrude by a predetermined length d, and may perform the function of a well-known sealing unit S.

The electrode leads 108 and 109 are exposed outside the battery case 102 and function as an electrode terminal. The electrode leads 108 are electrically connected to the electrode assembly 101, and may include a positive electrode lead 108 and a negative electrode lead 109. The electrode leads 108 and 109 including the positive electrode lead 108 and the negative electrode lead 109 are well-known, and thus, detailed description thereof will be omitted below.

The battery cell 100 formed of a plurality of the battery cells or a single battery cell has an approximately concave-convex (凹) shape, and may include a main cell part 110 and an auxiliary cell part 120.

The main cell part 110 is accommodated in an internal space of the module case 200, and may include the electrode leads 108 and 109 on one side 112. The main cell part 110 may have an approximately rectangular cross-section.

The external appearance of the main cell part 110 may include the battery cases 103 and 104, and end portions on boundaries of the main cell part 110 may be understood as the sealing unit S. Here, both end portions S1 and S2 included as the sealing portion S and connecting the one side 112 and the other side 116 of the main cell part 110 may each be folded at least once.

In detail, as illustrated in FIG. 5, both end portions S1 and S2 of the main cell part 110 may have a single-folded shape and may be included as a sealing portion S' that is folded once and has a shorter protrusion length d' than a protrusion length d of the sealing portion S when not folded, or may have a double-folded shape as illustrated in FIG. 6, and may be included as a sealing portion S" that is folded twice and has a shorter protrusion length d" than the protrusion length d' of the sealing portion S'.

When the folded sealing portions S' and S" are included as both end portions S1 and S2 of the main cell part 110, widths of both end portions S1 and S2 as the sealing portions S' and S" may be reduced. Accordingly, when the main cell part 110 is accommodated in the module case 200, in the main cell part 110, a volume area corresponding to the reduced widths of both end portions S1 and S2 may be added to the area, from which the sealing portions S' and S" are excluded.

Accordingly, according to the present embodiment, an area of a battery cell accommodated in the module case 200 may be extended via both end portions S1 and S2 of the main cell part 110 that are folded at least once, and thus, a capacity of the main cell part 110 accommodated in the module case 200 may be increased. The increase in the capacity of the main cell part 110 may indicate the increase in a capacity of the electrode assembly 101 corresponding to the main cell part 110.

The auxiliary cell part 120 may be formed integrally with the other side 116 of the main cell part 110 and extend and protrude therefrom, and may be disposed to fill internal space of the module case 200 and empty space between and the main cell parts 110. In the present embodiment, the auxiliary cell part 120 may protrude from a center of the other side 116 of the main cell part 110, in the form of a horizontally symmetrical rectangular form having a smaller cross-section than the main cell part 110. Accordingly, due to the protruding shape of the auxiliary cell part 120, the battery cell 100 has an approximately concave-convex (凸) shape described above. However, the shape is not limited thereto, and the auxiliary cell part may also be formed to have various protruding shapes such as a trapezoid shape, a chamfered rectangular shape, a semicircle shape or a semi-elliptic shape.

The auxiliary cell part 120 may be disposed between a pair of mounting parts 250 and 260 which will be described later, in the module case 200. In addition, the auxiliary cell part 120 may also be formed to be disposed in space that is not between the pair of mounting parts 250 and 260 as long as it is empty space between the module case 200 and the cell unit 100, inside the module case 200.

Accordingly, when the battery cell 100 is accommodated in the module case 200 via the auxiliary cell part 120 that is disposed between the pair of mounting parts 250 and 260, the battery cell 100 may also take up and be disposed in the space between the pair of mounting parts 250 and 260 of the module case 200. As a result, the battery cell 100 may be disposed and occupy most volume in the cell unit module case 200. As this means that the maximum area of the battery cell 100 may be ensured in the module case 200, a capacity of the battery cell 100 may be maximized within a limited size of the module case 200.

Meanwhile, a front end portion S3 of the auxiliary unit 120 may be understood as the sealing portion S like both end portions S1 and S2 on the boundaries of the main cell part 110. The front end portion S3 of the auxiliary cell part 120 may also be folded at least once like both end portions S1 and S2 of the main cell part 110.

Here, the front end portion S3 of the auxiliary cell part 120 is spaced apart from both end portions S1 and S2 of the main cell part 110. Thus, when the front end portion S3 of the auxiliary cell part 120 is folded, folding may be easily performed without being interrupted by both end portions S1 and S2 of the main cell part 110.

If a battery cell has a rectangular shape, and when after two facing end portions, that is, both corner areas are folded, then corner areas adjacent to the folded both corner areas are to be folded, folding of the adjacent corner areas to the folded corner areas is difficult due to the previously folded two corners. As a result, if a battery has a rectangular shape, due to the difficulty in folding, only corners facing each other can be folded, and thus, only two corners of the battery cell may be folded.

However, according to the present embodiment, when folding the front end portion S3 of the auxiliary cell part 120 protruding from the main cell part 110, both end portions S1 and S2 of the main cell part 110 do not affect, and thus, the sealing portion S may be folded at least three corners S1, S2, and S3 of the battery cell 100. Accordingly, in the present embodiment, as the sealing portion S of the three corners S1, S2, and S3 of the battery call 100 may be folded at least once, the battery cell 100 having a greater capacity may be accommodated in the module case 200.

The module case 200 has an approximately rectangular parallelepiped shape forming an internal accommodation space, and may accommodate the battery cell 100 such that the battery cell 100 is packaged. As the outer appearance of the module case 200 according to the present embodiment has a rectangular parallelepiped shape, the module case 200 may not have, for example, a structure that laterally protrudes to the outside. Accordingly, in the present embodiment, when the module case 200 is accommodated and mounted in the pack case 10, an external surface of the module case 200 may be almost adhered to an internal wall of the pack case 10 (see FIG. 1). Thus, in the present embodiment, when the module case 200 is accommodated in the pack case 10, empty space as unnecessary dead space may be hardly formed within the pack case 10.

In addition, the lead mounting portions 210 and 220, on which the electrode leads 108 and 109 of the battery cell 100 are mounted, are on one side 202 of the module case 200 described above, and on the other side 206 of the module case 200, the mounting parts 250 and 260 to be coupled to the pack case 10 may be included.

The lead mounting portions 210 and 220 may include a positive electrode lead mounting portion 210, on which the positive electrode lead 108 of the battery cell 100 is mounted, and a negative electrode lead mounting portion 220, on which the negative electrode lead 109 of the battery cell 100 is mounted.

The at least one positive electrode lead 108 mounted on the positive electrode lead mounting portion 210 may be electrically connected to each other so as to be electrically connected to a control board (not shown) of the battery module 20 or an electrode terminal (not shown) of the pack case 10 through an additional terminal member (not shown) or the like.

The at least one negative electrode lead 109 mounted on the negative electrode lead mounting portion 220 may also be electrically connected to each other, like the positive electrode leads 108, and may be electrically connected to a control board of the battery module 20 or an electrode terminal of the pack case 10 through an additional terminal member. As electrical connection of the positive electrode lead and the negative electrode lead to a control board and structures for the electrical connection are well-known, detailed description thereof will be omitted below.

One or a plurality of mounting parts 250, 260 may be included, and may be formed integrally with the module case 200 or may be mounted to the module case 200 as an additional member. Hereinafter, in the present embodiment, for stable coupling with respect to the pack case 10, description will focus on a plurality of mounting parts 250 and 260 that are formed integrally with the module case 200.

The plurality of mounting parts 250 and 260 may be two mounting parts. That is, a pair of mounting parts 250 and 260 may be included. The pair of mounting parts 250 and 260 include a first mounting part 250 and a second mounting part 260.

The first mounting part 250 may be integrally formed at an end portion of the other side 206 of the module case 200, and may include a coupling hole 252 for coupling the screw member 30. Here, the first mounting part 250 may have a structure that does not protrude out of the module case 200, and may be formed at an end portion of the other side 206 of the module case 200.

When accommodating the battery cell 100 in the module case 200, the first mounting part 250 may include two internal walls 255 and 256 disposed to face the battery cell 100.

When accommodating the battery cell 100 into the module case 200, the two internal walls 255 and 256 may include an internal wall 255 disposed to face the main cell part 110 of the battery cell 100 and an internal wall 256 disposed to face the auxiliary cell part 120 of the battery cell 100.

The second mounting part 260 may be integrally formed at the other end portion of the other side 206 of the module case 200, and may be spaced apart from the first mounting part 250 by a predetermined distance. The second mounting part 260 may also include a coupling hole 262 for coupling the screw member 30. Here, like the first mounting part 250, the second mounting part 260 may be formed at the other side portion of the other side 206 of the module case 200 with a structure that does not protrude out of the module case 200.

Like the first mounting part 250, the second mounting part 260 may also include two internal walls 265 and 266 disposed to face the battery cell 100 when accommodating the battery cell 100 in the module case 200.

When accommodating the battery cell 100 into the module case 200, the two internal walls 265 and 266 may include an internal wall 265 disposed to face the main cell part 110 of the battery cell 100 and an internal wall 266 disposed to face the auxiliary cell part 120 of the battery cell 100.

In the module case 200 in which the first mounting part 250 and the second mounting part 260 are formed as described above, through the above-described structure, a first accommodation space A1 and a second accommodation space A2 may be approximately formed inside the module case 200.

In the first accommodation space A1, the main cell part 110 of the battery cell 100 may be accommodated, and in the second accommodation space A2 formed between the first mounting part 250 and the second mounting part 260, the auxiliary cell part 120 of the battery cell 100 may be accommodated.

Accordingly, in the battery module 20 according to the present embodiment, the space A2 between the mounting parts 250 and 260 of the module case 200, that is, the second accommodation space A2 formed between the first and second mounting parts 250 and 260 may accommodate a portion 120 of the battery cell 100, and thus, the space A2 between the mounting parts 250 and 260 which could have become dead space may be used as the accommodation space A2 of the battery cell 100.

That is, in the battery module 20 according to the present embodiment, under limited design conditions for designing a case due to the size or limited number of the pack case 10 of the battery pack 1 or the module case 200 of the battery module 20 mounted in a vehicle or the like, space between mounting parts which has been left as empty space previously may also be used as accommodation space of the battery cell 100.

Accordingly, according to the battery module 20 according to the present embodiment, furthermore the battery pack 1 according to the present embodiment, space in the module case 200 may be used as accommodation space of the battery cell 100 as much as possible, and thus, a capacity of the battery cell 100, in detail, a capacity of the electrode assembly 101 may be maximized within a limited size of the module case 200.

Accordingly, in an automobile, particularly, in an electric vehicle or a hybrid vehicle in which the battery pack 1 including at least one of the battery module 20 according to the present embodiment is mounted, a maximum battery capacity may be ensured within a limited size of the battery pack 1, and thus, the battery pack 1 having a greater battery capacity at a given same size compared to conventional battery packs may be provided.

Accordingly, an electric vehicle or a hybrid vehicle including the battery pack 1 according to the present embodiment may realize a vehicle that has a longer distance per charge.

While the preferred embodiments of the present disclosure have been described and illustrated above, the present disclosure is not limited by the above-described particular embodiments, and it will be understood by those of ordinary skill in the art that various changes in form and details may be made therein without departing from the spirit and scope as defined by the following claims, and such possible modifications should not be construed as being separate from the scope or prospect of the present disclosure.

What is claimed is:

1. A battery module comprising:
   at least one battery cell, the at least one battery cell including:
   a battery cell case;
   an electrode assembly enclosed in the battery cell case, the electrode assembly comprising:
   a main cell part; and
   an auxiliary cell part protruding from one side of the main cell part; and a pair of electrode leads connected to the main cell part, the pair of electrode leads being spaced apart and separate from the auxiliary cell part, the pair of electrode leads extending through the battery cell case; and a module case having an internal space, wherein the at least one battery cell is accommodated in the internal space of the module case, the at least one battery cell having a shape corresponding to the internal space of the module case, and wherein the internal space includes a pair of recesses, and the pair of electrode leads are located in the pair of recesses and do not extend through the module case.

2. The battery module of claim 1, wherein the at least one battery cell has a volume corresponding to an internal space capacity of the module case.

3. The battery module of claim 1, wherein the auxiliary cell part has a cross-section of at least one of a rectangular shape, a trapezoid shape, a semicircle shape, and a semi-elliptic shape.

4. The battery module of claim 1, wherein the at least one battery cell has a concave-convex cross-section.

5. The battery module of claim 1, wherein the at least one battery cell comprises at least one of a pouch-type secondary battery and a can-type secondary battery.

6. The battery module of claim 1, wherein the module case comprises at least one mounting part that is disposed to face the at least one battery cell on at least two or more internal walls and that is couplable to a pack case of a battery pack.

7. The battery module of claim 6, wherein a lead mounting portion, on which the pair of electrode leads of the at least one battery cell are mounted, is formed on a first side of the module case, and the at least one mounting part is formed on a second side of the module case.

8. The battery module of claim 7, wherein the at least one mounting part is provided in a pair, wherein a first mounting part of the pair of mounting parts is formed at a first end portion of the second side and a second mounting part of the pair of mounting parts is formed at a second end portion of the second side of the module case such that the first mounting part and the second mounting part are spaced apart from each other by a predetermined distance.

9. The battery module of claim 8, wherein the pair of electrode leads are included on a first side of the main cell part, and wherein the auxiliary cell part protrudes from a second side of the main cell part, the auxiliary cell part being disposed between the pair of mounting parts in the internal space of the module case.

10. The battery module of claim 9, wherein the main cell part comprises a rectangular section, and the auxiliary cell part has a smaller rectangular section than the main cell part.

11. The battery module of claim 9, wherein the main cell part includes a pair of end portions connecting the first side and the second side of the main cell part, and each end portion of the pair of end portions is folded at least once.

12. The battery module of claim 11, wherein each end portion of the pair of end portions of the main cell part is folded twice.

13. A battery pack comprising:

at least one battery module according to claim 1; and a pack case configured to accommodate the at least one battery module.

14. The battery module of claim 1, wherein the module case has a hexahedral shape such that the at least one mounting portion extends inwards to define a portion of the internal space of the module case at a corner of the module case.

15. The battery module of claim 7, wherein the first side of the module case is opposite the second side of the module case and extends parallel to the second side.

16. The battery module of claim 14, further comprising at least one fastener, the at least one fastener being received in a coupling hole of the at least one mounting portion.

* * * * *